United States Patent
Schartner et al.

(10) Patent No.: US 8,237,087 B2
(45) Date of Patent: Aug. 7, 2012

(54) WELDING SYSTEM WITH TORQUE MOTOR WIRE DRIVE

(75) Inventors: Quinn W. Schartner, Kaukauna, WI (US); Andrew D. Nelson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 354 days.

(21) Appl. No.: 12/711,008

(22) Filed: Feb. 23, 2010

(65) Prior Publication Data

US 2011/0204033 A1 Aug. 25, 2011

(51) Int. Cl.
*B23K 9/10* (2006.01)
(52) U.S. Cl. .............. 219/130.21; 219/130.01; 219/136; 219/137 PS; 219/137.7
(58) Field of Classification Search ............. 219/130.01, 219/130.1, 130.21, 130.31, 130.32, 130.33, 219/130.4, 130.5, 130.51, 137.2, 137.31, 219/137.7, 137.71, 137.9
See application file for complete search history.

(56) References Cited

U.S. PATENT DOCUMENTS

| | | | |
|---|---|---|---|
| 6,903,305 B2 | 6/2005 | Mukai et al. | |
| 2006/0131293 A1 | 6/2006 | Kaufman | |
| 2006/0163230 A1 | 7/2006 | Kaufman | |
| 2008/0257874 A1 | 10/2008 | Kaufman et al. | |

FOREIGN PATENT DOCUMENTS

| | | |
|---|---|---|
| GB | 1340325 A | 12/1973 |
| JP | 60206579 A | 10/1985 |

OTHER PUBLICATIONS

International Search Report for application No. PCT/US2011/024577 mailed Jul. 15, 2011.

*Primary Examiner* — Tan T. Nguyen
(74) *Attorney, Agent, or Firm* — Fletcher Yoder, P.C.

(57) ABSTRACT

A welding system for welding with wire is disclosed that includes a torque motor in a wire feeder and a pull motor in a welding torch. A wire feed speed may be set by an operator at a power supply or on a wire feeder. Based upon calibration of the pull motor in the torch, upon startup of the welding operation, signals are provided to a pull motor and the torch in an open loop manner with respect to the speed of the pull motor, while the torque motor is driven to maintain a feed force on the welding wire to ensure that the pull motor has welding wire available for feeding. No other coordination is required between the torque motor and the pull motor.

22 Claims, 6 Drawing Sheets

WELDING SYSTEM WITH TORQUE MOTOR WIRE DRIVE

BACKGROUND

The invention relates generally to welding systems, and more particularly to a welding system designed to push and pull welding wire fed by a wire feeder.

A wide range of welding systems are known and are currently in use. These include stick welding systems and inert gas welding systems, and particularly, of the latter type, metal inert gas (MIG) welding systems. In MIG welding systems wire is fed from a spool through a welding cable to a welding torch. In many systems of this type the wire may be pushed through a welding cable and the torch via a drive motor in the wire feeder. The wire feeder itself may be packaged in a welding power supply, or may be in a separate enclosure coupled to the power supply. The wire is fed through the torch and is consumed as welding progresses, the metal of the wire forming part of the weld bead. In many such systems, gas is also fed through the torch to shield the weld pool, although the systems may also be adapted for gasless welding, such as through the use of self-shielded flux-cored wire.

In some systems of this type, drive motors and mechanisms in the wire feeder may not be sufficient or appropriate for the type of wire used. For example, aluminum wire typically cannot withstand the same degree of column loading as steel wire. Accordingly, systems have been developed to pull such wire through the welding torch, imparting a tensile load on the wire rather than or in addition to a compressive load from a motor in the wire feeder. Systems have also been developed to both push and pull the wire. These often require precise coordination of the drive motors that push and pull the wire to avoid either placing the wire between the motors under excessive tensile or compressive loads. Particularly troubling are compressive loads that may cause the wire to bunch or bend within the welding cable. Such malfunctions may require time consuming disassembly of the system to extract the wire and to re-feed it before welding can continue. Other issues exist with excessive pull or tensile forces insomuch as metal shavings from the welding wire can accumulate and cause problems with later operation.

Improved systems are therefore needed for feeding wire through welding systems to welding applications. There is, in particular, a need for systems that can allow for accurate speed control of the wire, while avoiding bunching or bending of the wire between push and pull drives.

BRIEF DESCRIPTION

The invention provides welding systems designed to respond to such needs. In an exemplary system described below, a welding system comprises a welding power supply and a wire feeder coupled to the welding power supply. The wire feeder itself comprises control circuitry and a torque motor responsive to the wire feeder control circuitry to apply a drive force to welding wire during a welding operation. A welding torch is coupled to the wire feeder to receive the welding wire, the welding torch comprising a pull motor configured to draw the welding wire through the torch. The wire feeder control circuitry is configured to reference calibration data for the pull motor and to command operation of the pull motor in an open loop manner with respect to the speed of the pull motor, based upon the calibration data and upon a desired wire feed speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
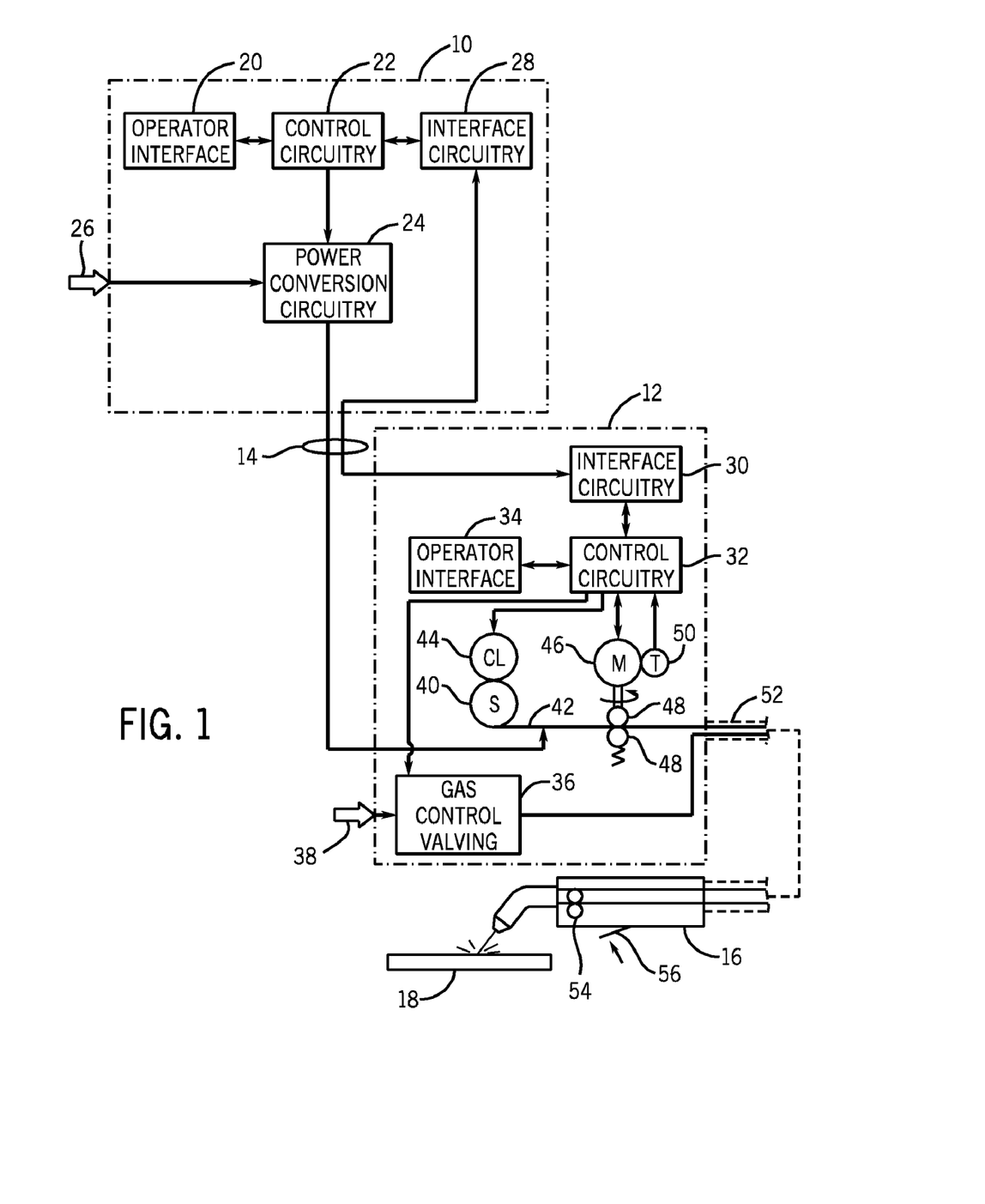
FIG. 1 is a diagrammatical representation of an exemplary MIG welding system illustrating a power supply coupled to a wire feeder in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices as described more fully below.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor (not shown) is typically run to the welding workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with aluminum or other welding wire that is both pushed towards the torch and pulled through the torch. These weld settings are communicated to control circuitry 22 within the power supply.

The control circuitry, described in greater detail below, operates to control generation of welding power output that is applied to the welding wire for carrying out the desired welding operation. In certain presently contemplated embodiments, for example, the control circuitry may be adapted to regulate a synergic MIG welding regime, and/or a synergic Pulsed MIG welding regime. The term "synergic welding", "synergic MIG welding" or "synergic Pulsed MIG welding" generally refers to welding algorithms in which the welding power output is coordinated with the wire feed speed, although no synergic welding algorithms have heretofore performed such coordination as set forth in the present discussion. "Pulsed welding" or "Pulsed MIG welding" refers to techniques in which a pulsed power waveform is generated, such as to control deposition of droplets of metal into the progressing weld pool. In a particular embodiment of the invention, a specialized pulsed welding regime may be implemented in which pulses are generated that have amplitudes that themselves vary over time. One such regime is commercially available under the designation Profile Pulse from Miller Electric Mfg. Co. of Appleton, Wis. In accordance with the present techniques, in all of these the control circuitry may at least partially base the parameters of the welding power generated upon the selected wire feed speed.

The control circuitry is thus coupled to power conversion circuitry 24. This power conversion circuitry is adapted to create the output power, such as in a synergic or pulsed waveform regime that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry also allows for calibration of feed rates for the wire as described below. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shield and gas to the torch. In general, such gas is provided at the time of welding, and may be turned on immediately preceding the weld and for a short time following the weld.

The gas applied to the gas control valving 36 is typically provided in the form of pressurized bottles, as represented by reference numeral 38.

The wire feeder 12 includes components for feeding wire to the welding torch and thereby to the welding application, under the control of control circuitry 32. For example, one or more spools of welding wire 40 are housed in the wire feeder. Welding wire 42 is unspooled from the spools and is progressively fed to the torch as described below. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 is provided for detecting the speed of the motor 46, the rollers 48, or any other associated component so as to provide an indication of the actual wire feed speed. Signals from the tachometer are fed back to the control circuitry 36, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire, typically by means of a welding cable 52 in a conventional manner. Similarly, shielding gas is fed through the wire feeder and the welding cable 52. During welding operations, the wire is advanced through the welding cable jacket towards the torch 16. Within the torch, an additional pull motor 54 is provided with an associated drive roller. The motor 54 is regulated to provide the desired wire feed speed as described more fully below. A trigger switch 56 on the torch provides a signal that is fed back to the wire feeder and therefrom back to the power supply to enable the welding process to be started and stopped by the operator. That is, upon depression of the trigger switch, gas flow is begun, wire is advanced, power is applied to the welding cable 52 and through the torch to the advancing welding wire. These processes are also described in greater detail below.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in pulsed welding regimes, the wire feed speed may be altered periodically or cyclically. In the Profile Pulse regime noted above, for example, periodic variations on the order of 1-5 Hz may be commanded. As described below, in all of these situations the present technique allows for such variations in the commanded wire feed speed, and consequent adjustments in the welding power output by the power supply.

Figure 2:
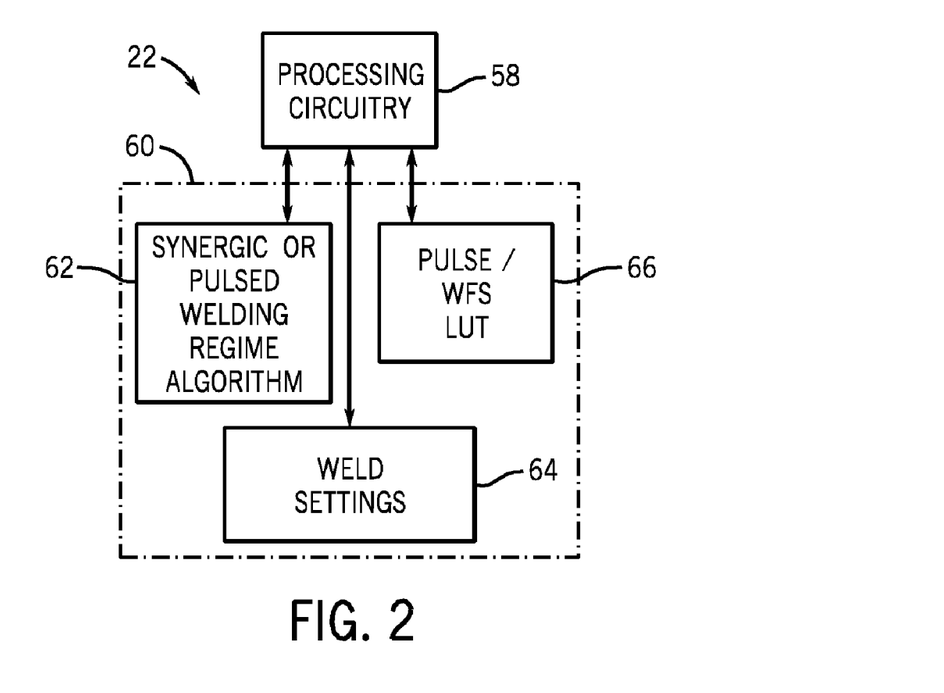
FIG. 2 is a diagrammatical representation of exemplary control circuitry components for a welding power supply of the type shown in FIG. 1.

FIG. 2 illustrates an exemplary embodiment for the control circuitry 22 of the power supply. In practice, the control circuitry will include various electronic circuits, including analog and digital components for processing the operator-input weld settings, processing the wire feed speed and other settings set or detected by the wire feeder, and for regulating the production of welding power by the power conversion circuitry 24 as shown in FIG. 1. In the embodiment illustrated in FIG. 2, the control circuitry includes processing circuitry 58 and memory circuitry 60. The processing circuitry may be based upon any suitable processing platform, such as a microprocessor, a field programmable gate array, an application specific integrated circuit having processing capabilities, and so forth. Similarly, memory circuitry 60 may be any suitable type of memory, such as electronic programmable read-only memory, random access memory, flash memory, or any other conventional memory included with or provided for the support of the processing circuitry.

The memory will typically serve to store operator settings, control regimes and algorithms, feedback and historical data, and so forth. Of particular interest for the present purposes are routines for the control of the power generation based upon wire feed speed. In the illustrated embodiment, for example, the memory circuitry stores a pulsed welding regime algorithm 62, along with weld settings 64 and a weld parameter look-up table 66. While a number of different welding processes may be carried out by the power supply under the control of the processing circuitry 58, a particular embodiment of the power supply allows for a pulsed MIG welding regime to be carried out in which multiple power pulses are applied in a pulsed waveform or train to the welding wire for controlling the deposition of wire in the advancing weld pool. This pulsed welding regime algorithm 62 is adapted to control parameters of the pulsed waveform based upon wire feed speed as described more fully below. As noted above, other welding algorithms may also be stored in the memory circuitry, such as synergic MIG welding regimes (not separately represented). These controls will typically be based at least in part upon the weld settings 64. The algorithm 62 will also make use of certain predetermined relationships between the wire feed speed and the parameters of the welding process, which may be stored in a look-up table form as indicated by look-up table 66. It should also be noted, however, that certain embodiments may make use of other data storage and reconstruction techniques than look-up tables. For example, welding regimes, wire feed speeds, calibration settings (described below) may be stored in the form of state engines, equations defining lines or curves, coefficients of formulae, and so forth. These may then be used by the processing circuitry for determining the desired welding parameters during welding as described below.

Figure 3:
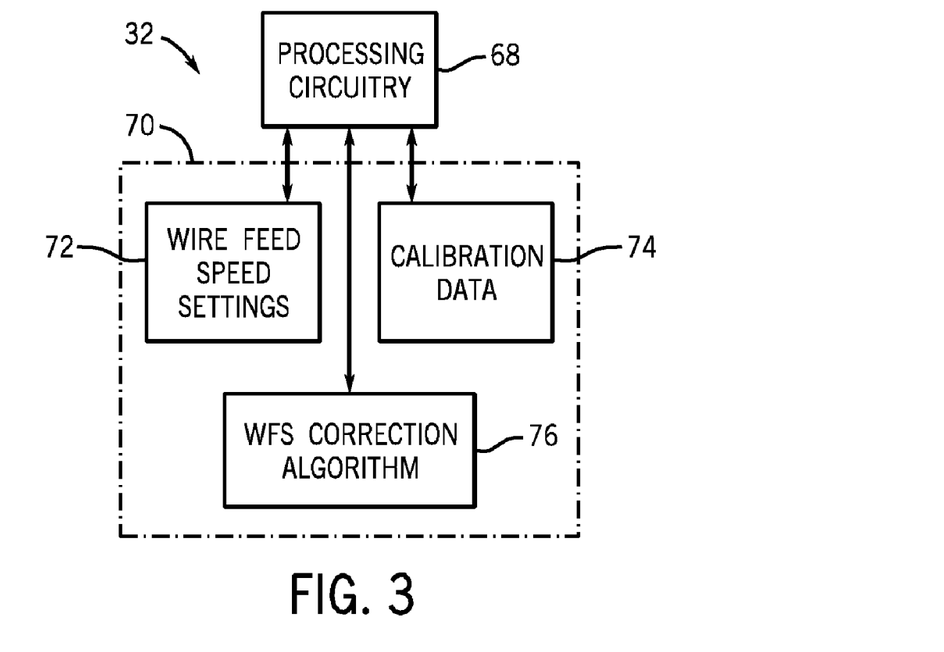
FIG. 3 is a diagrammatical representation of exemplary components of control circuitry for a wire feeder for a system of the type shown in FIG. 1.

FIG. 3 similarly illustrates certain functional circuitry that may be included in the wire feeder control circuitry 32. For example, in the illustrated embodiment, processing circuitry 68 is provided for performing certain computations and for controlling the wire feeder operation. The processing circuitry 68, like processing circuitry 58 of the power supply, may be based upon any suitable platform, such as a microprocessor, a field programmable gate array, or any other suitable processing configuration. The processing circuitry includes or is supported by memory circuitry 70. The memory circuitry 70 serves to store algorithms implemented by the processing circuitry 68, which will typically be in the form of a preprogrammed routines. For example, in the illustrated embodiment, wire feed speed settings 72 will be stored in memory, and could be set on the operator interface described above. Calibration data 74 is also stored for determining appropriate voltages (or more generally, command signals) to be applied to the drive motor 54 of the welding torch as also described in greater detail below. Based upon this calibration data, a wire feed speed correction algorithm 76 is stored that serves as the basis for computations of the motor output voltage implemented by processing circuitry 68.

It should be noted that in systems where a "built-in" wire feeder is used (i.e., integrated into the power supply), certain of these components may be combined. For example, the processing circuitry used to control the generation of welding power may also serve to drive the wire feeder components. Memory circuitry may also be shared, or some or all of the data required for wire feed speed regulation may be stored in the power supply, either separate or when integrated with the wire feeder.

In operation, the system undergoes a calibration routine to determine the appropriate drive signal level to be applied to the drive motor 54 of the welding torch. Resulting calibration data is then stored in the wire feeder (or elsewhere in the system, e.g., in the power supply). When a welding operation is to be performed, then, the wire is installed through the various components and through the torch, and the appropriate process, weld settings, wire selection, and so forth are selected by the operator via the operator interface 20 and the operator interface 34. Again, it should be noted that in certain embodiments these operator interfaces may be integrated as may the power supply and the wire feeder. The operator then positions the torch near the starting point of the weld to be carried out and depresses the trigger switch 56 as shown in FIG. 1. Wire is driven by motor 46, which is a torque motor, and pulled by motor 54 under the control of the control circuitry 32 of the wire feeder. Power and gas are also supplied by the power supply and an arc is initiated between the advancing wire and the workpiece to carry out the welding operation. Because synergic and pulsed welding regimes are particularly of interest in the present context, the wire feed speed set on the wire feeder is communicated to the power supply and the particular parameters of the welding power (e.g., the pulsed waveform when using pulsed welding) are adapted by the power supply based upon the wire feed speed.

Details of these operations are provided in the following discussion. However, it should be noted that certain advantages flow from this operation that will be apparent to those skilled in the art. For example, the use of a torque motor 46 in the wire feeder allows for applying a feeding force of the wire into the liner of the cable assembly. This feeding force allows for open-loop control of both the torque motor and the pull motor, while providing an inherent limitation on the torque and thereby the force applied to the wire drive and the wire. As used herein, the term "open loop" control is intended to relate to the open loop speed control of the pull motor. That is, the tachometer or speed sensor described above may be used for monitoring or even some regulation of operation of the wire feeder (e.g. for gradual changes in feed speed based on speed feedback), but during operation, no speed feedback signal is generated by or received from the pull motor in the torch. (Some embodiments may also utilize back EMF and or i*r compensation to improve motor speed regulation, but these are not closed loop speed sensor parameters.) This operation is particularly useful during feed speed transitions (i.e., starting and stopping, cyclical wire speed speed changes, rapid transitions, and so forth). The use of a torque motor for driving the wire also inherently compensates for springiness in the wire and the space between the wire and the inner liner of the weld cable. Moreover, as described in greater detail below, no speed coordination is required between the torque motor 46 and the pull motor 54. The torque motor 46 merely serves to maintain a pushing force to ensure the provision of wire to the pull motor 54. The system is also fully retrofittable insomuch as any torch may be used for synergic MIG welding and controlled pulsed MIG welding with no need for special closed-loop speed control through tachometers or other speed feedback devices in the torch.

Other advantages flow from the illustrated arrangement in terms of synergic and pulsed welding regimes. For example, rather than attempting to coordinate drive motor operation based upon pulse frequency, driving of the wire is greatly simplified by allowing wire feed speed to be simply regulated by signals applied to the pull motor 54 of the welding torch, with welding power, including where applicable, waveform pulses, being defined based upon this parameter. Similar wire feed speed reference can be used as a basis for any other change in the power parameters, and the wire feed speed need not be (and generally will not be) a static or fixed value, as described above. Moreover, the provision of a tachometer within the wire feeder for calibration purposes allows for adaptation of the system to ensure close regulation of the actual wire feed speed despite variances in component performance. Thus, the pulsed welding regime is inherently adapted to the calibrated wire feed speed, adding to the simplification of the control aspects, while providing desired coordination of the pulse waveform with the wire feed speed. The calibration also inherently accounts for variations of the voltage constant and non-ideal internal armature resistances in the pull motors, as well as system-to-system differences in roller slip, etc.

Figure 4:
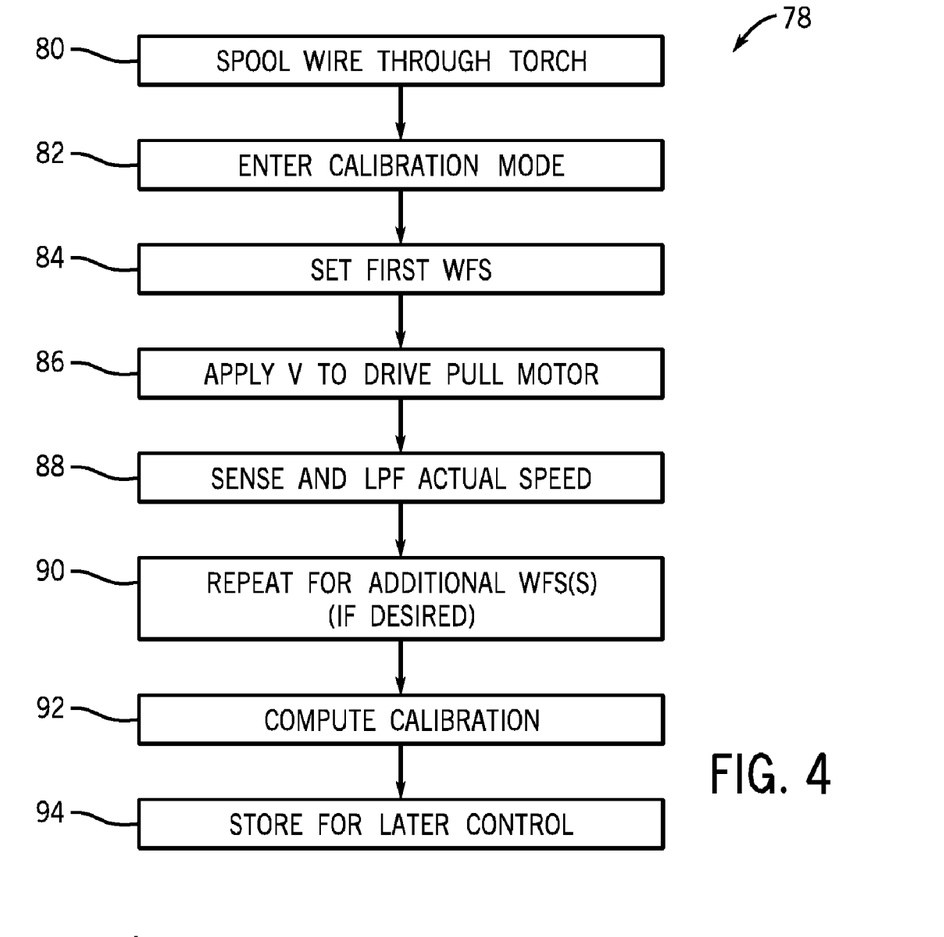
FIG. 4 is a flow chart illustrating exemplary steps in calibrating a wire feeder in accordance with aspects of the present techniques.

FIG. 4 illustrates exemplary steps in a routine for calibrating the drive signals applied to the pull motor before the welding torch. As will be appreciate by those skilled in the art, certain performance tolerances may result in deviations in drive speed of the motor 54 over a range of input signals (e.g., voltage levels). These variations could be corrected by closed loop control of the motor, such as by the use of a tachometer in the welding torch. However, the present technique makes use of a tachometer in the wire feeder that is used to calibrate the control signals applied to the pull motor. The calibration process, designated generally by reference numeral 78 in FIG. 4, begins with spooling the welding wire through the torch from the wire feeder, as indicated at step 80. With the wire thus in place, but without a welding operation taking place, the operator then enters into a calibration mode, as indicated at step 82 (e.g., through a displayed menu). The processing circuitry of the wire feeder then determines the voltage that would normally correspond to a first wire feed speed as indicated at step 84 (that may be user-set, but that in a present embodiment is defined by the calibration algorithm). This voltage may be determined by a computation carried out by the processing circuitry, such as based on stored settings in the feeder memory as described above, or may be determined from a look-up table, equation, or the like in the wire feeder. This voltage is applied to the pull motor as indicated at step 86 (with the torque motor pushing the wire also energized).

At step 88 the actual wire feed speed is detected (e.g., measured or sampled) by the tachometer in the wire feeder, such as over several seconds. The tachometer readings may be low pass filtered (e.g., averaged) or otherwise used to determine the actual wire feed speed over the sampled period. If only a single data point (e.g., for a particular wire feed speed of interest) is desired, the calibration process may then proceed to step 94 where a calibration value is stored that is representative of the difference (i.e., offset and/or slope) between the commanded and the actual wire feed speed, or the input signal needed to produce the commanded speed is stored. However, in many implementations it will be desirable to calibrate the system over a range of feed speeds. In such cases, this same process may then be repeated for at least one other wire feed speed (as indicated at step 90), which may be separated considerably from the first wire feed speed tested to improve calibration, and which, as in a current implementation, may be set automatically by the algorithm. With the wire having been driven at two wire feed speeds, and actual speeds having been sensed and/or computed, calibration settings are computed. Based upon the collected or computed wire feed speeds and the nominal drive voltages, then, calibration parameters are calculated as indicated at step 92. These calibration parameters are then stored for later use in control of the pull motor, as indicated at step 94. As noted above, the calibration values may be stored in the form of a look-up table, one or more equations, coefficients for equations, and so forth, either in the wire feeder or the power supply (or both).

A number of verifications in the calibration process may be implemented as well. For example, depending upon where the tachometer samples the speed, the process may require manual intervention, such as adjustment of the roller pressure to ensure that roller slip is minimized The tachometer may, for example, detect the torque motor shaft speed, the speed of one of the rollers, or the wire itself (e.g., by use of a separate roller). Also, the routine may call for determination of whether two or more commanded or actual speeds are sufficiently spaced to provide a reliable calibration, and so forth. Furthermore, where calibration was not successful for various reasons, the system may provide an indication of the reason for the error (e.g., slow wire movement, wire slippage, no tachometer signal, etc.).

Figure 5:
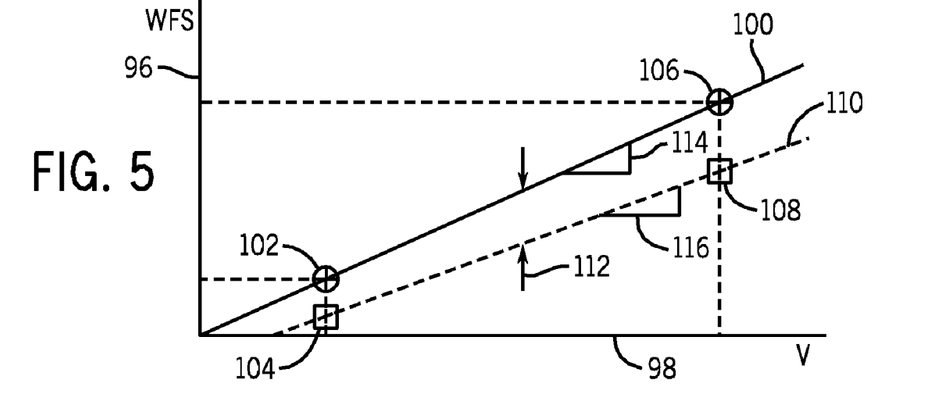
FIG. 5 is a graphical representation of the calibration procedure carried out in the steps of FIG. 4.

This calibration routine (for two commanded speeds) is illustrated graphically in FIG. 5. In particular, FIG. 5 represents wire feed speed along a vertical axis 96 as a function of the drive voltage 98 applied to the pull motor (with the torque motor engaged and operative). A design trace 100 represents the nominal relationship between the drive signal (voltage) and the wire feed speed. However, component deviations may be such that the wire feed speed is different from the design speed for a particular input or command signal. Thus, in the process summarized in FIG. 4, a first wire feed speed is selected as represented by a first voltage input signal, as illustrated at point 102 along the design trace. However, if a deviation exists in the particular motor or setup (e.g., due to drag, etc.), a different wire feed speed will result from the input signal, as indicated by point 104. When the process is repeated, another design point 106 is selected, and again a deviation may result in the actual wire feed speed point 108. Based upon these two points, then, the actual relationship between the input signal and the wire feed speed may be determined as indicated by actual trace 110. As noted in the graphical representation of FIG. 5, this actual trace may be offset from the design trace as indicated by reference numeral 112, and/or the traces may have different slopes as indicated reference numerals 114 and 116. It should also be noted that the actual trace may be above, below or may cross the design trace. Following the calibration process, then, a formula or algorithm is developed for the actual relationship (e.g., the equation of the actual trace) between the input signals and the actual wire feed speeds, or a series of calibration points are determined along the design trace. In operation, then, when a desired wire feed speed is selected, the required input signal for the pull motor is determined based upon the calibration information. In the case of a look-up table, for example, reference may be made to the design trace and individual offsets along the design trace to obtain the actual trace. In such cases, interpolation between the look-up table points may be in order when wire feed speeds are selected at locations between these intervals. Where equations are employed (or coefficients of equations used for reconstruction of the actual relationship), one or more equations may be determined and stored, such as to capture non-linearities in the command-to-speed relationship.

The foregoing process allows for what is essentially open-loop control (from a speed standpoint) of wire feed speed by regulation of the pull motor in the torch. As discussed above, the tachometer may be used from time to time for re-calibration or checking these settings (or even for closed-loop control), but it has been found that good control of wire feed speed is obtained by reliance upon the calibration information with no speed feedback from the torch pull motor. When used in conjunction with the torque motor, then, no coordination of the drive signals applied to the torque motor with the drive signals applied to the pull motor is needed. Similarly, when used with a synergic or pulsed welding regime, the system has been found to operate very well with calibrated drive signals applied to the pull motor, operational signals (i.e., ON/OFF) only applied to the torque motor (or two or more discrete, e.g., high and low, settings), and welding power parameters determined based upon the desired wire feed speed.

Figure 6:
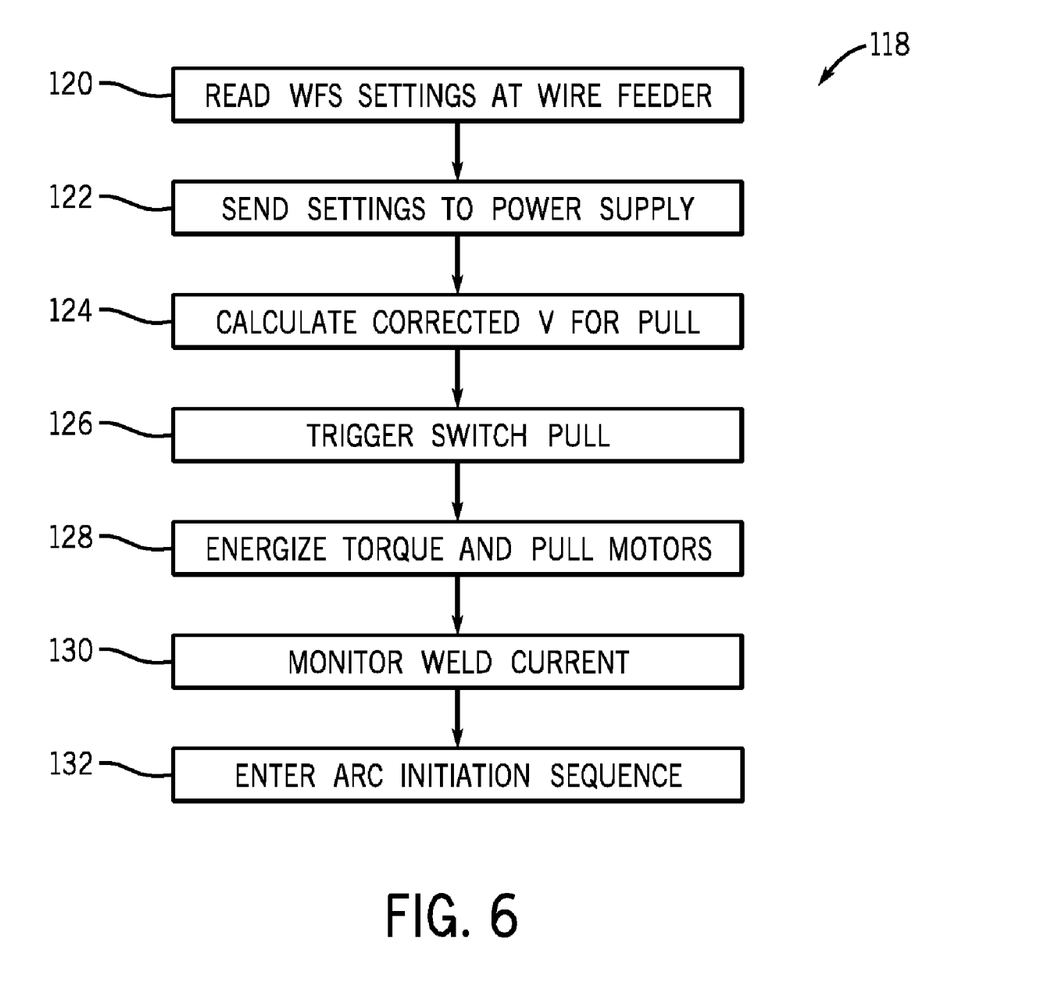
FIG. 6 is a flow chart illustrating exemplary steps in an algorithm for initiating a weld via the system of FIG. 1.

FIG. 6 illustrates exemplary steps in the initiation of an arc in accordance with the present techniques, and based upon the system and calibration described above. The arc initiation routine, indicated generally by reference numeral 118, begins with reading the wire speed settings at the wire feeder as indicated by step 120. The wire feed speed settings are then transmitted to the power supply as indicated at step 122, such as through the interface circuitry described above and to the processing circuitry. At step 124 the wire feeder calculates the corrected input signal for the pull motor disposed in the welding torch. Again, this calculation will be based upon the calibration settings determined through calibration process, such as that described above with reference to FIGS. 4 and 5. At step 126, then, the operator begins the welding process by depressing the trigger switch on the welding torch handle. At step 128, based upon this signal, the wire feeder energizes the torque motor to apply a pushing force to the wire, and the pull motor to draw the wire through the torch. At step 130 the system monitors welding current. That is, prior to establishing an arc, no current will flow through the welding wire and the workpiece back to the power supply (due to the open circuit). Once an arc (or a short circuit) is established a current can be detected by the power supply, the current flowing through the closed loop path established through the wire feeder, the welding wire and the workpiece. At step 132 the system enters an arc initiation sequence, in which wire feed and welding power are coordinated to reliably start an arc between the welding wire and the workpiece.

Figure 7:
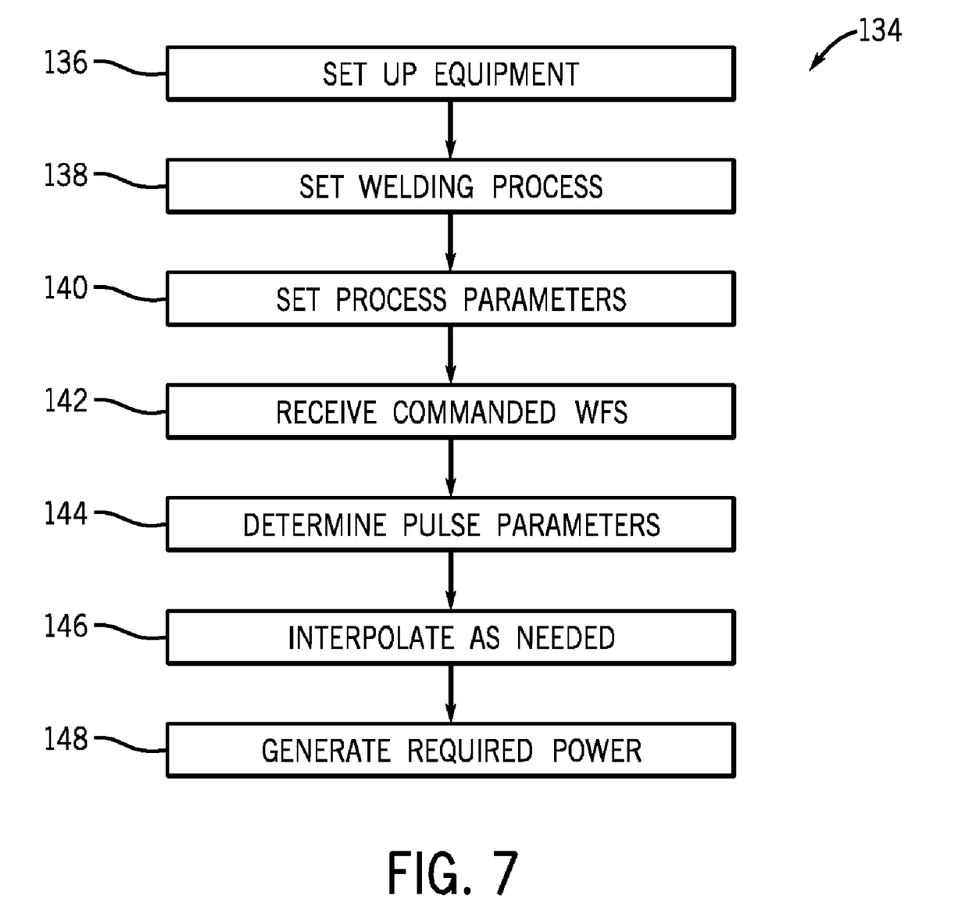
FIG. 7 is a flow chart of an exemplary algorithm for controlling pulsed welding parameters as a function of wire feed speed.

FIG. 7 illustrates exemplary steps in implementing a synergic or pulsed welding regime based upon wire feed speed after initiation of the arc. The process, indicated generally by reference numeral 134, may begin with the initial setup of the equipment, as described above (including the calibration routine). An operator may then select a welding process, as indicated by reference numeral 138. As noted above, of particular interest in the present context are synergic MIG and pulsed MIG processes. This selection is typically made via the power supply operator interface (or the wire feeder operator interface). At step 140, then, the operator may set certain process parameters, such as current or power levels, wire feed speed, and so forth. At step 142 the commanded wire feed speed is received by the power supply control circuitry, such as from the control circuitry of the wire feeder. As noted above, such commands will often vary during welding, and the flow chart of FIG. 7 should be understood as repeatedly determining, transmitting and receiving the wire feed speed commands.

Based upon this wire feed speed commands, power parameters are determined as indicated at step 144. In the case of pulsed waveforms, of particular interest here, one or more parameters of the pulse train or waveform are determined These parameters may be identified by reference to a look-up table stored in the power supply as discussed above, or to one or more equations, equation coefficients, and so forth. In a present implementation for pulsed welding, for example, the look-up table may include parameters such as the peak current of the waveform, the pulse width, the background current of the waveform, the pulse frequency, rise and fall rates of pulses, pulse curvature, and so forth. Similar parameters may be determined from mathematical relationships, state engines, and so forth that define the waveforms. These parameters may be referenced for various combinations of wire and gas. That is, individual settings may be provided for different wire types (e.g., aluminum wire), wire sizes, and combinations of these with particular shielding gasses. Moreover, each of these parameters is referenced by the commanded wire feed speed. As indicated at step 146, certain of these parameters may be further refined by interpolation between predetermined settings stored in a look-up table. That is, where wire feed speeds are set between stored data points in the look-up table, the other referenced parameters may be determined by interpolating between the closest available points (e.g., by linear interpolation). At step 148, then, the welding power in accordance with the determined parameters is generated by the conversion circuitry in the power supply and applied to the wire for carrying out the desired welding operation. Where changes are made to the wire feed speed, then, by the operator or more commonly by algorithms used to generate the speed commands, the process summarized in FIG. 7 is repeated for the new wire feed speed commands.

Figure 8:
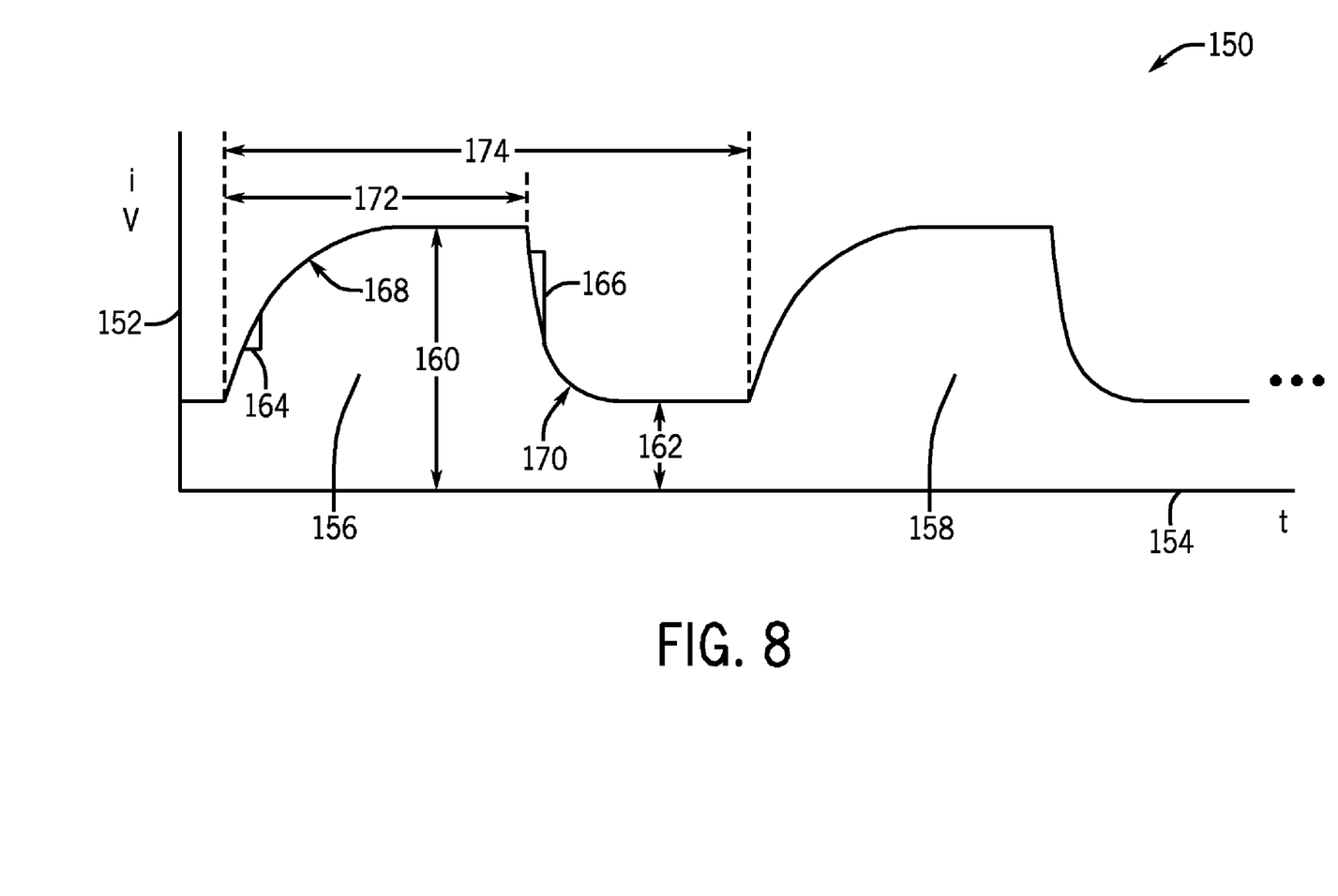
FIG. 8 is a graphical representation of an exemplary waveform for a pulsed welding regime that may be implemented in accordance with the present techniques.

FIG. 8 represents an exemplary pulsed waveform 150 of a type that may be used in pulsed welding, and the parameters of which may be determined by reference to commanded wire feed speed, as described above. The waveform represents current and/or voltage along a vertical axis 152 as a function of time along axis 154. The waveform comprises a series of pulses 156 and 158. Taking, for example, a waveform that represents commanded current, the waveform may be defined by a peak current 160 for each pulse, followed by a background current 162 between pulses. Each pulse may be further defined by one or more ramp-up rates 164 and one or more ramp-down rates 166. Where desired, curves or transitions may be defined between the ramps and the peak and/or background currents, as indicated by reference numerals 168 and 170. The duration of each pulse may also be defined, as indicated by reference numeral 172, and may the period of repetition of the pulses, as indicated by reference numeral 174 (which effectively defines the frequency of the pulsed waveform). Some or all of these parameters may be altered "on the fly" by reference to the commanded wire feed speed. In a practical implementation, the actual values of these parameters will be determined empirically, such as for certain wire compositions, wire sizes, shielding gases, and so forth. It should also be noted that in certain regimes, the background and peak values may themselves rise and fall cyclically or periodically. Such variations may also be implemented based upon reference to the commanded wire feed speed.

While only certain features of the invention have been illustrated and described herein, many modifications and changes will occur to those skilled in the art. It is, therefore, to be understood that the appended claims are intended to cover all such modifications and changes that fall within the true spirit of the invention.

The invention claimed is:

1. A welding system comprising:
a welding power supply;
a wire feeder coupled to the welding power supply and comprising control circuitry and a torque motor responsive to the wire feeder control circuitry to apply a drive force to welding wire during a welding operation; and
a welding torch coupled to the wire feeder to receive the welding wire, the welding torch comprising a pull motor configured to draw the welding wire through the torch;
wherein the wire feeder control circuitry is configured to reference calibration data for the pull motor and to command operation of the pull motor without speed feedback from the welding torch based upon the calibration data and upon a commanded wire feed speed.

2. The welding system of claim 1, wherein the calibration data is obtained by the wire feeder in accordance with a calibration algorithm.

3. The welding system of claim 2, wherein the calibration data is determined based upon a design response of the pull motor and an actual response detected during operation in accordance with the calibration algorithm.

4. The welding system of claim 2, wherein the calibration data is stored in the welding system for later use in control of the pull motor.

5. The welding system of claim 4, wherein the wire feeder control circuitry is configured to interpolate between stored calibration points when the commanded wire feed speed does not correspond to a value stored in the welding system.

6. The welding system of claim 1, wherein the wire feeder comprises an operator interface on which an operator sets the commanded wire feed speed.

7. The welding system of claim 1, wherein the wire feeder is configured to transmit a signal to power supply control circuitry indicative of the commanded wire feed speed, and wherein the power supply control circuitry is configured to command generation of welding power based upon the received wire feed speed signal.

8. The welding system of claim 7, wherein the power supply control circuitry commands generation of welding power having a pulsed waveform, parameters of the pulsed waveform being determined by the power supply control circuitry based upon the commanded wire feed speed.

9. A welding system comprising:
a welding power supply comprising power supply control circuitry and power conversion circuitry responsive to the power supply control circuitry to generate welding power;
a wire feeder coupled to the welding power supply and comprising control circuitry and a torque motor responsive to the wire feeder control circuitry to apply a drive force to welding wire during a welding operation; and
a welding torch coupled to the wire feeder to receive the welding wire, the welding torch comprising a pull motor configured to draw the welding wire through the torch;
wherein the wire feeder control circuitry is configured to reference calibration data for the pull motor and to command operation of the pull motor without speed feedback from the welding torch based upon the calibration data and upon a commanded wire feed speed; and
wherein the power supply control circuitry receives a signal from the wire feeder indicative of the commanded wire feed speed and commands the power conversion circuitry to generate a pulsed waveform based upon the commanded wire feed speed.

10. The welding system of claim 9, wherein the calibration data is obtained by the wire feeder in accordance with a calibration algorithm.

11. The welding system of claim 10, wherein the calibration data is determined based upon a design response of the pull motor and an actual response detected during operation in accordance with the calibration algorithm.

12. The welding system of claim 11, wherein the calibration data is stored in the welding system for later use in control of the pull motor.

13. The welding system of claim 12, wherein the wire feeder control circuitry is configured to interpolate between stored calibration points when the commanded wire feed speed does not correspond to a value stored in the welding system.

14. The welding system of claim 9, wherein the wire feeder comprises an operator interface on which an operator sets the commanded wire feed speed.

15. A welding system comprising:
a welding power supply;
a wire feeder coupled to the welding power supply and comprising control circuitry and a torque motor responsive to the wire feeder control circuitry to apply a drive force to welding wire during a welding operation; and
a welding torch coupled to the wire feeder to receive the welding wire, the welding torch comprising a pull motor configured to draw the welding wire through the torch based on a commanded wire feed speed;
wherein the wire feeder control circuitry is calibrated for operation of the torque motor in accordance with an algorithm comprising:
operating the pull motor at one or more commanded wire feed speeds and detecting a resulting actual wire feed speed; and
storing calibration data based upon the commanded wire feed speed and the actual wire feed speed.

16. The welding system of claim 15, wherein during calibration of the wire feeder control circuitry in accordance with the calibration algorithm, the pull motor is operated at a plurality of commanded wire feed speeds, respective actual wire feed speeds are detected, and the calibration data is derived from the commanded and actual wire feed speeds.

17. The welding system of claim 16, wherein the wire feeder comprises a tachometer configured to detect the actual wire feed speeds.

18. The welding system of claim 16, wherein during welding operations the wire feeder control circuitry is configured to operate the pull motor in a open loop manner.

19. The welding system of claim 18, wherein during welding operations the wire feeder control circuitry is configured to command operation of the pull motor based upon the commanded wire feed speed and the calibration data.

20. The welding system of claim 16, wherein the wire feeder is configured to transmit a signal to power supply control circuitry indicative of the commanded wire feed speed, and wherein the power supply control circuitry is configured to command generation of welding power based upon the received wire feed speed signal.

21. The welding system of claim 20, wherein the power supply control circuitry commands generation of welding power having a pulsed waveform, parameters of the pulsed waveform being determined by the power supply control circuitry based upon the commanded wire feed speed.

22. A welding system comprising:
  a welding power supply comprising power supply control circuitry and power conversion circuitry responsive to the power supply control circuitry to generate welding power;
  a wire feeder coupled to the welding power supply and comprising control circuitry and a torque motor responsive to the wire feeder control circuitry to apply a drive force to welding wire during a welding operation; and
  a welding torch coupled to the wire feeder to receive the welding wire, the welding torch comprising a pull motor configured to draw the welding wire through the torch;
  wherein the wire feeder control circuitry is configured to command operation of the pull motor and the torque motor; and
  wherein the power supply control circuitry commands the power conversion circuitry to implement a synergic welding operation coordinated with the wire feed speed.

* * * * *